(12) United States Patent
Hershey et al.

(10) Patent No.: US 6,792,058 B1
(45) Date of Patent: Sep. 14, 2004

(54) DIGITAL RECEIVING SYSTEM FOR DENSE ENVIRONMENT OF AIRCRAFT

(75) Inventors: John Erik Hershey, Ballston Lake, NY (US); Ralph Thomas Hoctor, Saratoga Springs, NY (US); Richard August Korkosz, Rotterdam Junction, NY (US); Charles McDonald Puckette, IV, Scotia, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 550 days.

(21) Appl. No.: 09/614,776

(22) Filed: Jul. 12, 2000

(51) Int. Cl.$^7$ ................................................. H04L 1/02

(52) U.S. Cl. ...................... 375/347; 375/267; 375/349

(58) Field of Search .............................. 375/260, 267, 375/285, 346, 347, 349, 350, 316; 342/357.01–357.17; 455/65, 132, 303

(56) References Cited

U.S. PATENT DOCUMENTS

| | | | | |
|---|---|---|---|---|
| 4,733,402 A | * | 3/1988 | Monsen ....................... | 375/347 |
| 5,081,463 A | * | 1/1992 | Hariu et al. ................. | 342/372 |
| 5,191,349 A | | 3/1993 | Dinsmore et al. .......... | 343/751 |
| 5,196,855 A | * | 3/1993 | Kuroda ........................ | 342/37 |
| 5,363,109 A | | 11/1994 | Hoefgen et al. ............. | 342/31 |
| 5,374,932 A | * | 12/1994 | Wyschogrod et al. ......... | 342/36 |
| 5,570,095 A | | 10/1996 | Drouilhet, Jr. et al. . | 342/357.07 |
| 6,313,783 B1 | * | 11/2001 | Kuntman et al. ............. | 342/32 |
| 6,448,926 B1 | * | 9/2002 | Weinberg et al. ...... | 342/357.06 |

FOREIGN PATENT DOCUMENTS

EP        0 905 528 A     3/1999

OTHER PUBLICATIONS

Orlando et al., "GPS–Squitter: System Concept, Performance, and Development Program", The Lincoln Laboratory Journal, vol. 7, No. 2, 1994, pp. 271–294.

NAS Architecture DRAFT, Federal Aviation Administration, Dec. 1997, pp. 99–100.

Daniel Storm Hicok, et al., Application of ADS–B for Airport Surface Surveillance, IEEE, 1998, pp. F334–1–F34–8.

RTCA, "Executive Summary of the Final Report of RTCA Task Force 3 Free Flight Implementation", Oct. 26, 1995, pp. 1–13.

Roger Smith, "FAA Planning Major Runway–Incursion Prevention System TEST at DFW" taken from Inside FAA, Nov. 27, 1998.

NAS Architecture, Status of Ongoing Activities, "Increasing NAS Capacity through Greater Situational Awareness", Issue 12, Nov. 6, 1997.

RTCA, Minimum Aviation System Performance Standards for Automatic Dependent Surveillance Broadcast (ADS–B), Document No. RTCA/DO–242, Feb. 19, 1998, pp. 16–18, 61, 80–86, 88, 89, Appendix J.

RTCA, Final Report of RTCA Task Force 3, "Free Flight Implementation", Oct. 26, 1995.

* cited by examiner

*Primary Examiner*—Chieh M. Fan
(74) *Attorney, Agent, or Firm*—Scully, Scott, Murphy & Presser

(57) ABSTRACT

The capacity of a Mode-S ADS-B surveillance radar system is increased by sectorizing the radar system by the use of a directional array of Mode-S, quarter wavelength, single element, stub antennas. The ensemble of signals from the array of Mode-S antenna elements is processed electronically. The signal processing/receiver architecture increases the capacity of the Mode-S ADS-B system to be capable of effectively functioning within a highly congested airspace.

15 Claims, 2 Drawing Sheets

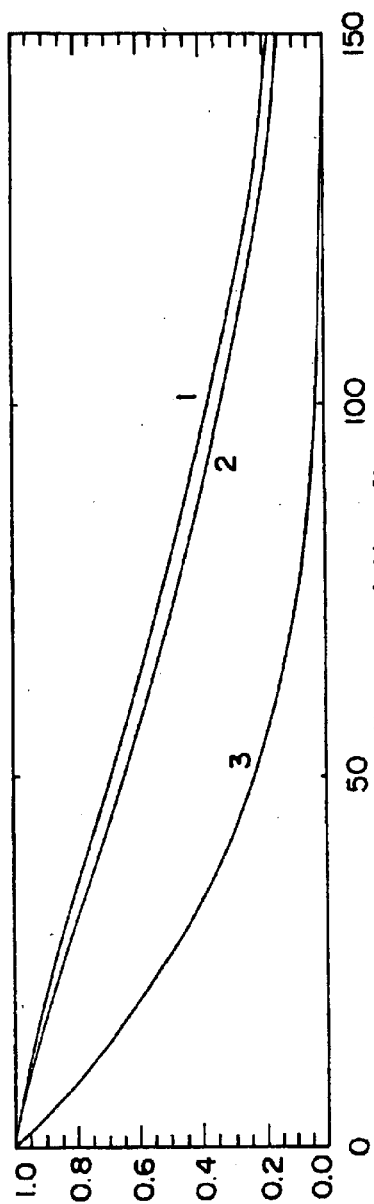
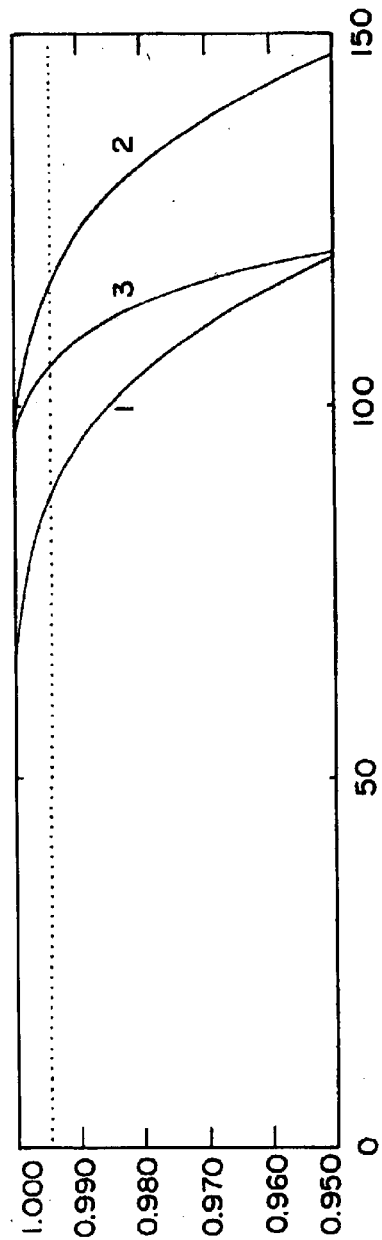
Case 1: x = 9, n3 = 6
Case 2: x = 18, n3 = 12
Case 3: x = 144, n3 = 96

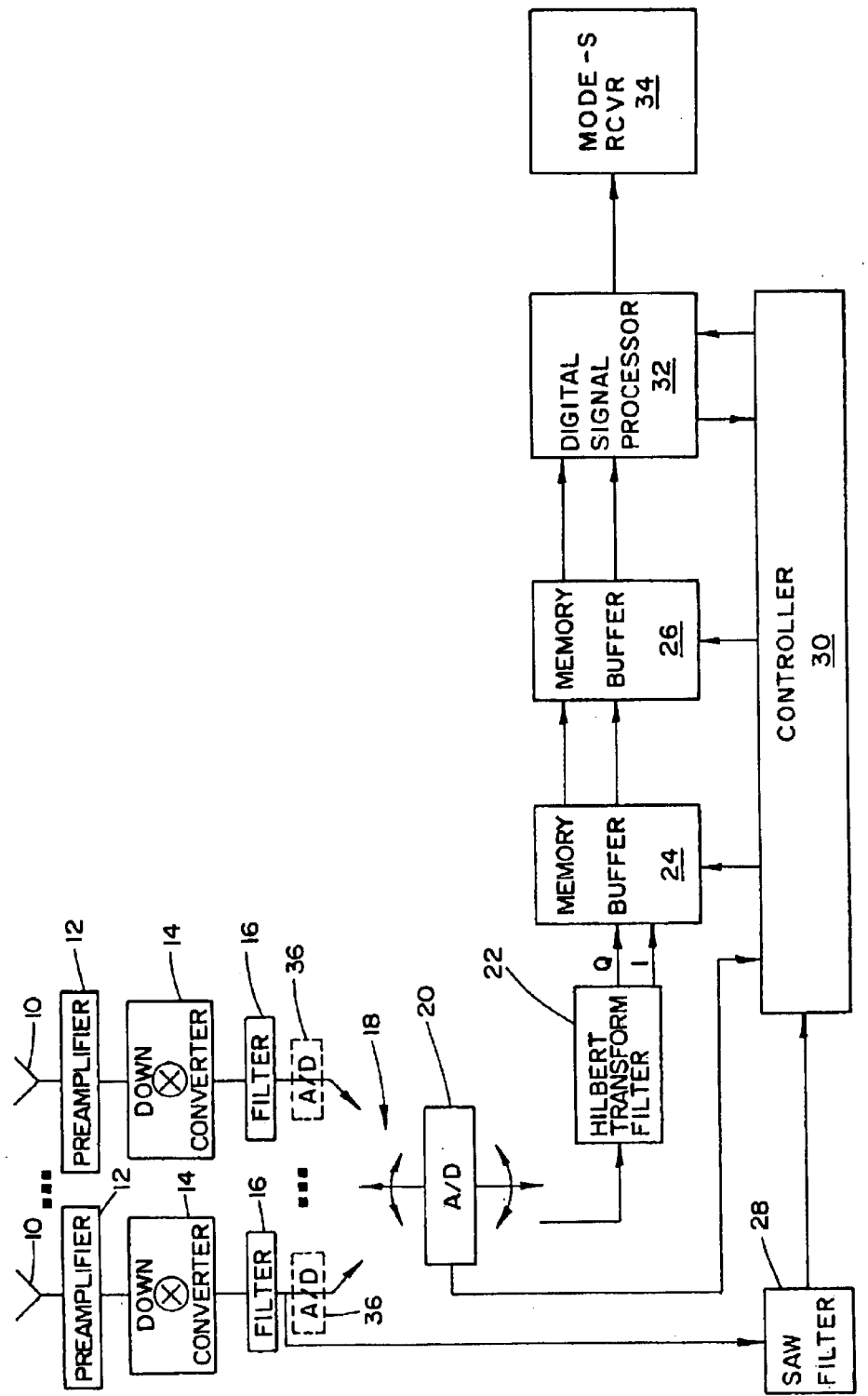

DIGITAL RECEIVING SYSTEM FOR DENSE ENVIRONMENT OF AIRCRAFT

BACKGROUND OF THE INVENTION

The present invention concerns a digital receiving system for an ADS-Mode-S system which is capable of effectively functioning and operating competently within a highly congested airspace having a dense environment of aircraft.

In an ADS (Automatic Dependent Surveillance) system, an aircraft periodically broadcasts its state vector (horizontal and vertical position, horizontal and vertical velocity). The aircraft relies upon on-board navigation sources such as an on-board GPS (Global Positioning System) receiver and its broadcast transmission systems to provide surveillance information to other users.

The ADS-Mode-S concept is based upon the use of a Mode S squitter which provides a periodic broadcast (i.e., "squitter") of the aircraft's position, altitude, identification, and other information.

At the present time, a Mode-S 56-bit squitter is used by the Traffic Alert and Collision Avoidance System (TCAS) to detect the presence of Mode-S equipped aircraft. The TCAS listens for Mode-S squitters and extracts a 24-bit Mode-S address, and uses this address for discrete interrogation. The longer 112 bit squitter replies contain, in addition to other data, 56-bits referred to as an ADS message field. The bits in the ADS message field convey data including (1) barometric altitude, (2) latitude, and (3) longitude. Aircraft equipped with a Mode-S transponder and a GPS receiver determine their position once every second, and this positional information is inserted into the 56-bit ADS message field of the long squitter reply, and broadcast twice every second to increase the probability of a successful reception. The current 56-bit short squitter continues to be broadcast once every second for compatibility with the TACS. Thus, potential interference is caused by both short and long squitter transmissions.

The present invention enhances the capability of a basic ADS-Mode-S system to receive ADS-Mode-S messages error free by using an array of basic Mode-S antenna elements, and processes the ensemble of signals electronically. The subject invention provides a signal processing/receiver architecture which enhances the capability of a basic ADS-Mode-S system to receive ADS-Mode-S messages error free, so that it is capable of effectively functioning within a highly congested airspace.

The information provided by an ADS-Mode-S message can assist pilots of nearby aircraft in the implementation of free flight plans, and is also monitored by ATS (Air Traffic Services) to ensure that an aircraft maintains conformance to its intended trajectory.

Free Flight is a concept which is being developed, tested, and implemented incrementally by the Federal Aviation Administration (FAA) and the aviation community. Free Flight is designed to enhance the safety and efficiency of the National Airspace System (NAS). The concept moves the NAS from a centralized command-and-control system between pilots and air traffic controllers to a distributed system that allows pilots, whenever practical, to choose their own route and file a flight plan that follows the most efficient and economical route.

The realization of free flight will require cooperative decision making among aircraft. One of the key system considerations for implementing such realization is an adequate surveillance architecture. Today navigation and surveillance is accomplished primarily by ground equipments, i.e., beacon radars and primary radars that do not operate in concert.

Radars are used today in two ways in air traffic control. The first, primary radar usage is an equipment which measures distance to an aircraft by measuring the round-trip time of a pulse from the radar to the plane which scatters the pulse. Some of the scattered or reradiated energy is detected by the radar receiver which is usually collocated with the radar transmitter. The second type of radar which is used in air traffic control is termed secondary radar. This genre of radar requires a transponder to be installed aboard an aircraft. When the aircraft is illuminated by an interrogation pulse of a secondary radar, the transponder broadcasts a digital signal which may convey aircraft identification and altitude.

ADS-B (Automatic Dependent Surveillance-B) is a function on an aircraft or a surface vehicle operating within the surface movement area which periodically broadcasts its state vector (horizontal and vertical position, horizontal and vertical velocity) and other information. ADS-B is automatic because no external stimulus is required to elicit a transmission; it is dependent because it relies on on-board navigation sources and on-board broadcast transmission systems to provide surveillance information to other users. The aircraft or vehicle originating the broadcast may or may not have knowledge of which users are receiving its broadcast; any user, either aircraft or ground-based, within range of the broadcast, may choose to receive and process ADS-B surveillance information. With ADS-B, ATS (Air Traffic Services) would monitor the ADS-B messages ensuring that an aircraft maintains conformance to its intended trajectory. The increased accuracy and additional information directly provided by the aircraft (via ADS-B), in comparison to radar-based monitoring, will result in quicker blunder detection and reduce false alarms.

The National Airspace System (NAS) Architecture (Dec. 1997), section 7.9, notes that ADS-B is initially intended as a surveillance system, not an avoidance system. Broader application will depend upon the creation of an ADS-B ground surveillance capability. As restrictions are relaxed and flexibility enhanced, it is expected that ADS-B will be a key component leading to both free flight and IFR (Instrument Flight Rules) cooperative-separation.

The ADS-B system is required to operate competently within a peak traffic environment. This requirement is based upon the Los Angeles Basin traffic model. The ADS-B network must be designed to accommodate expected future peak airborne traffic levels, as well as any airport surface units within range. The expected peak instantaneous airborne count (IAC) in the US has been given by the Los Angeles Basin traffic model. Traffic distributions for the Los Angeles Basin, as well as for a number of other measured terminal area distributions, are closely approximated by a uniform density function (cumulative number increasing as the square of the range from the center) out to about 15 nmi. From this point to 60 nmi, the cumulative number of aircraft is proportional to the range. The approximate IAC distribution for the Los Angeles Basin model has a peak count of 750 aircraft. This does not include aircraft or vehicles which are operating on the airport surface. Estimates for these additional traffic elements are 100 vehicles in motion and 150 surface units at rest. Thus, the total traffic density may total to 1,000 units within a radius of 60 nmi. This does not include any adjacent sector en route traffic.

Mode S was originally developed as a requisite surveillance improvement for Mode A/C secondary surveillance radar (Air Traffic Control Radar Beacon System or ATCRBS). In these modes, an interrogation at 1030 MHz triggers a response at 1090 MHz from an aircraft equipped with a Mode S transponder. Mode A consists of an 8 microsecond interrogatory which is answered with a 20.3 microsecond replay conveying the aircraft identification code. In Mode C, the interrogatory is 21 microseconds and the reply is 20.3 microseconds and yields the aircraft altitude. Typically an aircraft is illuminated with Mode A and then Mode C.

In Mode S, using the same frequency plan, an interrogatory consists of a preamble of duration 3.5 microseconds followed by a data block of either 16.26 microseconds or 30.26 microseconds conveying 56 or 112 data bits. (One and a quarter microseconds are used for a synchronization phase reversal training.) The interrogatory is DPSK at a rate of 4 megabits per second. The Mode S reply comprises a 6 microsecond preamble followed by a data block of 56 or 112 microseconds. The signaling is PPM at a data rate of 1 megabit per second.

The ADS-Mode S has been described as a system concept that merges the capabilities of Automatic Dependent Surveillance (ADS) and the Mode S beacon radar. The result is an integrated system for seamless surveillance and data link which permits equipped aircraft to participate in ADS or beacon ground environments. This offers many possibilities for transitioning from a beacon to an ADS based surveillance system.

The ADS-Mode S concept is based upon the use of a Mode S squitter. The current Mode S squitter is a spontaneous, periodic (once per second) 56 bit broadcast message containing the Mode S 24 bit address. This broadcast is provided by all Mode S transponders and is used by the Traffic Alert and Collision Avoidance System (TCAS) to acquire nearby Mode S equipped aircraft. The aircraft position messages would be transmitted at an average rate of 2 Hz. The actual spacing between squitters would be randomized slightly to prevent synchronous interference between two aircraft. The spacing between the position squitters would be uniformly distributed between 0.4 and 0.6 seconds.

ADS-B transponders will provide a periodic broadcast (i.e., "squitter") of the aircraft's position, altitude, identification, and other information. By the year 2005, these transponders will also respond to interrogations from SSRs (Secondary Surveillance Radars). The most accurate (and intended) position reference will be the GPS receiver carried on board the aircraft. The ADS-B transponder will be a direct replacement for Mode A/C transponders or an upgrade to Mode S transponders.

The operating capacity of the proposed ADS-Mode S system is believed to be limited by interference on the 1090 frequency which consists of transponder replies to ATCRBS interrogations (20 microseconds in duration), "short" (56—bit) Mode S replies, and "long" Mode S replies (112—bit).

The capacity is modeled by assuming a Poisson arrival at a receiver. The ADS-Mode S squitter is assumed to be received without error if no other Mode S replies overlap it and there is at most one ATCRBS reply that overlaps it. From these assumptions, it has been computed that the probability, p, that an ADS-Mode S squitter is received without error is, $$p = (1 + t_1 n_1 m) e^{-t1n1m} * e^{-t2n2m} * e^{-t3n3m} \quad (1)$$

where
$n1$ is the average number of ATCRBS replies per aircraft per second, $n2$ is the average number of short Mode S replies per aircraft per second, $n3$ is the average number of long Mode S replies per aircraft per second, $m$ is the number of aircraft that may initiate interfering replies, $t1$ is the time duration that the ADS-Mode S squitter is vulnerable to the start of an ATCRBS reply, $t2$ is the time duration that the ADS-Mode S squitter is vulnerable to short Mode S replies, $t3$ is the time duration that the ADS-Mode S squitter is vulnerable to long Mode S replies.

$\{ti\}$ is estimated as:

$t1 = 0.000140$ seconds, $t2 = 0.000184$ seconds, and $t3 = 0.000240$ seconds.

From these values an estimate is calculated of the system's capacity. An update rate of about 5 seconds is required with reliability 99.5% or better.

This is a bit conservative in light of the following. Acceptable combinations of report update period (T) and update probability (P) are given by the formula $$(1-P)^{TC/T} \leq 0.01$$

where TC is the $99^{th}$ percentile report update period. For example, for conflict avoidance, TC=6 sec.; a report update period of T=3 would require P=0.9 or greater. As a second example, for conflict avoidance, if P=0.5, then T must be 0.9 seconds or less. TC represents a coast period, that is, the maximum allowable time between state vector report updates.

Three cases are posited distinguished by the average number of ATCRBS replies per aircraft per second n1. The most stringent of the cases is for n1=120. The other parameters are fixed for all three cases with n2=8 and n3=6. They determine that the aircraft capacity is 86 planes under these assumptions. They note, however, that this result is for an omnidirectional antenna. A 6 sector antenna (en-route) can improve this number by a factor of two and a half to 215 aircraft.

The capacity is markedly increased as n1 is decreased to zero, however, it is insufficient to handle the full pressure of the Los Angeles Basin traffic model. There are things that can be done to try to increase the capacity. One thing that is tempting is to increase the transmission rate, i.e., increase n3. By increasing n3, one increases the number of attempts within 5 seconds to get an errorless reception of the long Mode-S. As the squitter rate averages 2 Hz, there will be at least 9 tries within 5 seconds. If x represents the number of attempts to receive an errorless squitter message, then the probability that at least one squitter message per aircraft will be received without error is $$1 - (1-p)^x \quad (2)$$

where the p is as defined in equation (1). The graphs in FIGS. 1 and 2 display three cases. It is assumed that x will increase in direct proportion to n3. Note that doubling n3 (case II) gives a gain, but increasing n3 by a factor of 16 (case III) reduces the capacity below that which was achieved by simply doubling n3. What is happening, of course, is that more and more interference is being created as n3 increases.

BRIEF SUMMARY OF THE INVENTION

The present invention increases the capacity of a Mode-S system by sectorizing with the use of directional Mode-S antennas, particularly by the use of an inexpensive Mode-S, quarter wavelength, single element, stub antenna.

The present invention uses an array of basic Mode-S antenna elements, and processes the ensemble of signals electronically. To operate in denser environments, more antenna elements could be added as needed. Generally, given N antenna elements, it is possible to steer N-1 nulls.

The digital receiving system for dense environment of aircraft of the present invention is a signal processing/receiver architecture which increases the capacity of the Mode-S ADS-B system so that it is capable of effectively functioning within a highly congested airspace.

This invention has very significant primary and secondary benefits, and can provide a clear and cost effective path to realizing the ADS-B function in a manner which is scalable and uses extant equipment to the maximum extent possible.

The primary benefits are that the invention is scalable, and is continuously upgradable for increased capacity, is backwards compatible, should be relatively low cost to manufacture, presents worldwide frequency spectrum allocation and approval, transponder maturity—the Mode-S system is well known and accepted, and also can be used to counter and null out multipath by attenuating gain direction.

The secondary benefits are that the invention is frequency friendly, with the short wavelength enabling a significant realizable aperture, there are no moving parts to the antenna aperture, there is no active control of antenna elements, e.g. no component phase shifters, provides security, e.g. it can easily null out a jammer or a rogue transmitter, can be used to backup a failed GNSS (Global Navigation Satellite System), can also check the consistency of other users' GNSS, and can be used to support direct sequence spread spectrum communications to counter a "near/far" problem.

BRIEF DESCRIPTION OF THE DRAWINGS

FIGS. 1 and 2 present graphs of respectively the probability of a specific squitter being received correctly, and the probability of at least one squitter being received correctly for three cases:

case 1, x=9, n3=6; case 2, x=18, n3=12; and case 3, x=144, n3=96.

FIG. 3 is a schematic block diagram of one embodiment of a digital receiving system for dense environment of aircraft pursuant to the invention.

DETAILED DESCRIPTION OF THE INVENTION

The present invention increases the capacity of the Mode-S system by sectorizing the antenna response with a multi-element antenna in a manner that is generally well known in the prior art. The TCAS (Traffic Alert and Collision Avoidance System) equips an aircraft with a directional antenna. In aircraft equipped with TCAS and Mode-S, the TCAS and Mode-S communicate internally via the 429 bus. The Mode-S uses a 2" high, quarter wavelength, single element, stub antenna. The TCAS uses an antenna array. One of these arrays appears somewhat like a "FRISBEE®" with a 9" diameter and a protrusion of about 1" above the aircraft skin. The antenna is steered and provides an estimate of the bearing of the received signal. The cost of a Mode-S antenna is on the order of $150 or less. The cost of a TCAS antenna is on the order of $10K. Also, the TCAS antenna must be matched to the specific TCAS processing unit.

The present invention uses a basic Mode-S antenna but adds more of them and processes the ensemble of signals electronically. The cost of electronics continues to decline and the ability to perform increasingly complex and rapid signal processing continues to grow. To operate in ever denser environments, more antenna elements could be added as needed. As a general rule of thumb, given N antenna elements, it is possible to steer N-1 nulls.

The digital receiving system for dense environment of aircraft of the present invention uses a signal processing/receiver architecture which increases the capacity of the Mode-S ADS-B system to be capable of effectively functioning within a highly congested airspace such as is specified by the Los Angeles Basin traffic model. It operates as follows:

(1) Referring to FIG. 3, a spatial array of antenna elements 10 is established on the aircraft.

(2) The output of each antenna element 10 is amplified by a preamplifier 12.

(3) The output of each preamplifier 12 is down-converted by a down converter 14 using a local oscillator (not shown).

(4) The output of each down converter 14 is filtered by a filter 16 to remove out-of-band signal energy.

(5) The outputs of the filters are sequentially and periodically connected to a high-rate analog-to-digital converter (A/D) 20 by a multiplexer 18. The A/D converter samples the output of the filter to which it is connected and which produces pairs of time-offset samples for each filter output. In an alternative embodiment, a separate A/D converter 36 can be provided for each signal from each antenna element, and the outputs connected to a digital multiplexer.

(6) One of the time-offset samples is Hilbert transformed by a Hilbert Transform filter (approximation) 22 to produce a quadrature I and Q sample pair.

(7) The sample pairs are stored in two cascaded Memory/Buffer units 24 and 26.

(8) A surface acoustic wave (SAW) filter 28, or an equivalent filter, constantly looks for the presence of a squitter preamble, i.e., it constantly convolves the coherent output of a single, and therefore nearly omnidirectional, antenna element with the squitter preamble signature. The output of the SAW filter 28 is input to a controller unit 30.

(9) A digital signal processing unit 32 interfaces with controller unit 30, and produces an output to a Mode-S receiver (RCVR) 34.

(10) The controller unit 30 has a complex set of responsibilities. On notification by the SAW filter 28 that a squitter preamble is present, the controller 30:

a. Isolates the Mode-S message in the right most memory/buffer 26 where it causes the Mode-S message to be retained until processing is complete;

b. The controller 30 directs the digital signal processing unit 32 to adjust the complex weights of all antenna element samples in order to maximize the signal-to-noise ratio of the isolated Mode-S message. There are a number of algorithms by which this can be accomplished. For example, as the preamble is known, it can be used to guide an adaptive beamforming algorithm or decision directed search;

c. Once the signal-to-noise ratio has been maximized, the controller 30 orders the digital signal processing unit 32 to output the cleaned Mode-S message to the Mode-S receiver 34 and allows the memory/buffer units 24 and 26 to resume operation in cascade.

The function of the digital signal processing unit 32 is generally well known in the art, and after a Mode-S signal is detected, the digital signal processing unit 32 processes and adjusts complex weights of the digital signals for the separate antenna elements' signals to maximize the signal-to-noise ratio of the received Mode-S signal, in a manner as is generally well known in the art.

The controller unit 30 basically controls the functions being performed by the memory buffers 24, 26 and the digital signal processor 32. The controller unit 30 controls the memory/buffers 24, 26 and the digital signal processing unit 32. The controller unit 30, upon receiving a signal from the squitter filter 28 that a squitter preamble has been detected, controls the memory/buffers 24, 26 to isolate the Mode-S signal in the second memory/buffer 26 wherein the Mode-S signal is retained until processing is completed. The controller unit 30 also directs the digital signal processing unit 32 to commence processing to adjust complex weights of all antenna element digital signals to maximize the signal-to-noise ratio of the isolated Mode-S signal. After the digital processing unit has completed processing to maximize the signal-to-noise ratio, the controller unit 32 directs the digital signal processing unit 30 to output the Mode-S signal to the Mode-S receiver 34, and directs the memory/buffers 24, 26 to resume a normal sequenced operation.

Many possible algorithms can be implemented by the DSP 32. For example, if the direction-of-arrival estimation were done on the preamble of a Mode-S message, then other messages could be rejected. The rejection could be temporary, i.e., the latter message(s) could be delayed for subsequent processing or handed off to a parallel chain for processing. The rejection can use a power minimization technique with a response constraint in the direction of the message transmitter.

This invention has very significant primary and secondary benefits, and can provide a clear and cost effective path to realizing the ADS-B function in a manner which is scalable and uses extant equipage to the maximum extent possible. In summary, the benefits are:

The primary benefits are that the invention is scalable, and is continuously upgradable for increased capacity, is backwards compatible, should be relatively low cost to manufacture, presents worldwide frequency spectrum allocation and approval, transponder maturity the Mode-S system is well known and accepted, and also can be used to counter and null out multipath by attenuating gain direction.

The secondary benefits are that the invention is frequency friendly, with the short wavelength enabling a significant realizable aperture, there is no active control of antenna elements, e.g. no component phase shifters, provides security, e.g. it can easily null out a jammer or a rogue transmitter, can be used to backup a failed GNSS (Global Navigation Satellite System), can also check the consistency of other users' GNSS, and can be used to support direct sequence spread spectrum communications to counter a "near/far" problem.

While several embodiments and variations of the present invention for a digital receiving system for dense environment of aircraft are described in detail herein, it should be apparent that the disclosure and teachings of the present invention will suggest many alternative designs to those skilled in the art.

What is claimed is:

1. A Mode-S digital receiving system for receiving and processing Mode-S signals in an aircraft operating in a dense environment of aircraft comprising:
   a. a spatial array of Mode-S antenna elements mounted on the aircraft;
   b. a signal processing receiver for producing and processing a separate signal for each separate antenna element;
   c. at least one analog to digital (A/D) converter for converting the signals for the separate antenna elements to corresponding digital signals;
   d. a multiplexer for sequentially and periodically coupling at least one signal or digital signal from the separate antenna elements;
   e. a squitter filter for determining the presence of a squitter preamble in a Mode-S signal received by the receiving system;
   f. a digital signal processing unit, responsive to the determined presence of the Mode-S signal, for processing and adjusting complex weights of the digital signals for the separate antenna element to maximize the signal-to-noise ratio of the received Mode-S signal;
   g. a Mode-S receiver, coupled to the output of the digital signal processing unit, for processing and identifying technical data conveyed by the Mode-S signal.

2. The Mode-S digital receiving system of claim 1, further comprising:
   a. a memory/buffer stores the digital signals in sequence therein;
   b. a controller unit is coupled to the output of the squitter filter and controls the memory/buffer and the digital signal processing unit, wherein the controller unit, upon being notified by the squitter filter that a squitter preamble is present,
      isolates the Mode-S signal in the memory/buffer wherein the Mode-S signal is retained until processing is completed,
      directs the digital signal processing unit to adjust complex weights of all antenna element digital signals to maximize the signal-to-noise ratio of the isolated Mode-S signal, and
      after the signal-to-noise ratio has been maximized, the controller unit directs the digital signal processing unit to output the Mode-S signal to the Mode-S receiver, and directs the memory/buffer to resume sequenced operation.

3. The Mode-S digital receiving system of claim 2, wherein:
   a. the analog to digital (A/D) converter produces a pair of time offset digital signals for each signal;
   b. a Hilbert Transform filter Hilbert transforms one of the pair of time offset digital signals to produce a quadrature I and Q sample pair which is directed as an input to the memory/ buffer.

4. The Mode-S digital receiving system of claim 1, wherein each Mode-S antenna element comprises a quarter wavelength, single element, stub antenna.

5. The Mode-S digital receiving system of claim 1, wherein in the signal processing receiver, each antenna element has associated therewith:
   a. a preamplifier for amplifying an output of the antenna element;
   b. a frequency down converter for frequency down converting an output of the preamplifier; and
   c. a filter for filtering an output of the down converter to remove out of band signal energy, to produce a signal output.

6. The Mode-S digital receiving system of claim 2, wherein the memory/buffer comprises first and second cascaded memory/buffer units.

7. The Mode-S digital receiving system of claim 6, wherein the controller unit, upon being notified that the squitter preamble is present, isolates the Mode-S signal in the second memory/buffer unit.

8. The Mode-S digital receiving system of claim 1, wherein the squitter filter comprises a surface acoustic wave filter which constantly convolves a filtered output of an antenna element with a squitter preamble signature to determine the presence of the squitter preamble.

9. A method for receiving and processing Mode-S signals in an aircraft operating in a dense environment of aircraft comprising:

a. mounting a spatial array of Mode-S antenna elements on the aircraft;

b. producing and processing a separate signal for each separate antenna element;

c. converting the signals for the separate antenna elements to corresponding digital signals;

d. sequentially and periodically coupling at least one signals or digital signals from the separate antenna elements;

e. determining the presence of a squitter preamble in a Mode-S signal received by a receiving system;

f. in response to the determined presence of the Mode-S signal, processing and adjusting complex weights of the digital signals for the separate antenna element to maximize the signal-to-noise ratio of the received Mode-S signal;

g. processing and identifying technical data conveyed by the maximized signal-to-noise ratio Mode-S signal.

10. The method of claim 9, comprising:

a. storing the digital signals in sequence in a memory/buffer;

b. upon determining that presence of the squitter preamble, isolating the Mode-S signal in the memory/buffer wherein the Mode-S signal is retained until processing is completed, adjusting complex weights of all antenna element digital signals to maximize the signal-to-noise ratio of the isolated Mode-S signal, and after the signal-to-noise ratio has been maximized, outputting the Mode-S signal, and resuming sequenced operation of the memory/buffer.

11. The method of claim 10, comprising:

a. producing a pair of time offset digital signals for each signal;

b. transforming one of the pair of time offset digital signals to produce a quadrature I and Q sample pair which is directed as an input to the memory/buffer.

12. The method of claim 9, comprising mounting a spatial array of quarter wavelength, single element, stub antennas.

13. The method of claim 9, comprising:

a. preamplifying an output of each antenna element;

b. frequency down converting an output of each preamplifier; and c. filtering an output of each down converted output to remove out of band signal energy, to produce a signal output.

14. The method of claim 10, comprising providing first and second cascaded memory/buffer units, and upon being notified of the presence of the squitter preamble, isolating the Mode-S signal in the second memory/buffer unit.

15. The method of claim 9, comprising employing a surface acoustic wave filter which constantly convolves a filtered output of an antenna element with the squitter preamble signature to determine the presence of the squitter preamble.

\* \* \* \* \*